United States Patent
Pugh et al.

(10) Patent No.: US 12,124,481 B2
(45) Date of Patent: Oct. 22, 2024

(54) DATA UPDATE SYSTEM AND METHOD

(71) Applicant: Ontology-Partners Limited, London (GB)

(72) Inventors: John Pugh, Brentwood (GB); David Pecollet, London (GB); Chris Wood, Brighton (GB)

(73) Assignee: Ontology-Partners Limited, London (GB)

( * ) Notice: Subject to any disclaimer, the term of this patent is extended or adjusted under 35 U.S.C. 154(b) by 15 days.

(21) Appl. No.: 17/186,151

(22) Filed: Feb. 26, 2021

(65) Prior Publication Data

US 2021/0279263 A1    Sep. 9, 2021

(30) Foreign Application Priority Data

Mar. 4, 2020 (EP) .................................... 20161036

(51) Int. Cl.
*G06F 16/28* (2019.01)
*G06F 16/23* (2019.01)
(Continued)

(52) U.S. Cl.
CPC ............ *G06F 16/287* (2019.01); *G06F 16/23* (2019.01); *G06F 16/24564* (2019.01); *G06F 16/288* (2019.01)

(58) Field of Classification Search
CPC . G06F 16/287; G06F 16/288; G06F 16/24564
See application file for complete search history.

(56) References Cited

U.S. PATENT DOCUMENTS 7,324,981 B2 * 1/2008 Chickering ............ G06N 7/005
707/999.005
7,606,782 B2  10/2009 Haley
(Continued)

FOREIGN PATENT DOCUMENTS

EP     2 731 023 A1    5/2014
WO   2017/189026 A1   11/2017

OTHER PUBLICATIONS

Baswana, Surender, Ramesh Hariharan, and Sandeep Sen. "Improved decremental algorithms for maintaining transitive closure and all-pairs shortest paths." Journal of Algorithms 62.2 (2007): 74-92. (Year: 2007).*

(Continued)

*Primary Examiner* — Mohsen Almani
(74) *Attorney, Agent, or Firm* — Baratta Law PLLC; Lawrence A. Baratta, Jr.; Ryan Odessa

(57) ABSTRACT

A computer-implemented method includes receiving one or more update requests; identifying, a set of foundational relationships for deletion from a graph database; inferring, using one or more relationship inference rules, a set of inferred relationships for deletion from the graph database; and deleting, from the graph database, the set of foundational relationships for deletion and the set of inferred relationships for deletion. Inferring the set of inferred relationships for deletion includes searching for relationships in the set of foundational relationships for deletion that match a relationship specified in a precondition of at least one of the one or more relationship inference rules; determining whether the precondition is satisfiable using at least one of (Continued)

the matching relationships; and, in response to the precondition being satisfiable, inferring at least one of the relationships of the set of inferred relationships for deletion using at least one of the matching relationships.

19 Claims, 9 Drawing Sheets

(51) Int. Cl.
    *G06F 16/2455*      (2019.01)
    *G06F 16/901*      (2019.01)

(56) References Cited

U.S. PATENT DOCUMENTS

| | | |
|---|---|---|
| 8,001,070 B2 | 8/2011 | Zhang et al. |
| 8,631,033 B2 | 1/2014 | Anderson et al. |
| 9,430,552 B2 | 8/2016 | Adya et al. |
| 2011/0087629 A1* | 4/2011 | B'Far .................. G06F 16/254 706/46 |
| 2015/0302300 A1 | 10/2015 | Fletcher et al. |
| 2017/0169073 A1 | 6/2017 | Pirahesh et al. |
| 2018/0285480 A1 | 10/2018 | Standefer, III et al. |
| 2018/0330008 A1* | 11/2018 | Fan .................. G06F 16/9024 |

OTHER PUBLICATIONS

Wu, Zhe, et al. "Implementing an inference engine for RDFS/OWL constructs and user-defined rules in Oracle." 2008 IEEE 24th International Conference on Data Engineering. IEEE, 2008. (Year: 2008).*

Hong, Ki-Sup, and Lynn Choi. "DAG-based multipath routing for mobile sensor networks." ICTC 2011. IEEE, 2011. (Year: 2011).*

Roditty, Liam, and Uri Zwick. "Improved dynamic reachability algorithms for directed graphs." SIAM Journal on Computing 37.5 (2008): 1455-1471. (Year: 2008).*

Jun. 30, 2020, European Search Report issued for European Patent Application No. EP 20 16 1036.

"Rete Algorithm", Wikipedia entry, [Online], Jul. 10, 2019, Retrieved on Nov. 6, 2019, Retrieved on the Internet <URL: https://en.wikipedia.org/w/index.php?title=Rete_algorithm&oldid=905717571>.

* cited by examiner

DATA UPDATE SYSTEM AND METHOD

CROSS-REFERENCE TO RELATED APPLICATION(S)

This application claims priority of European patent application EP 20161036.7 filed Mar. 4, 2020, the specification of which is hereby incorporated by reference in its entirety.

FIELD OF THE DISCLOSURE

This specification relates to systems and methods for updating graph databases.

BACKGROUND OF THE DISCLOSURE

Graph databases represent data using graph structures comprised of nodes and relationships. Nodes are used to represent data items in the database, while relationships represent relationships between these data items. In graph databases, relationships themselves are persisted in the database unlike other types of database. A type of graph database is a triplestore. Triplestores store data as triples. A triple has three parts, which may be called: the subject, the predicate and the object.

BRIEF SUMMARY OF THE DISCLOSURE

A first aspect of the specification provides a computer-implemented method including: receiving one or more update requests; identifying, based on the one or more update requests, a set of foundational relationships for deletion from a graph database; inferring, using one or more relationship inference rules, a set of inferred relationships for deletion from the graph database based on the set of foundational relationships for deletion, and deleting, from the graph database, a set of relationships for deletion comprising the set of foundational relationships for deletion and the set of inferred relationships for deletion.

Inferring the set of inferred relationships for deletion may include: searching for relationships in the set of foundational relationships for deletion that match a relationship specified in a precondition of at least one of the one or more relationship inference rules; determining whether the precondition is satisfiable using at least one of the matching relationships; and in response to the precondition being satisfiable, inferring at least one of the relationships of the set of inferred relationships for deletion using at least one of the matching relationships.

Determining whether the precondition is satisfiable using at least one of the matching relationships may include pre-binding one or more variables in the precondition to one or more nodes connected by the at least one of the matching relationships. Determining whether the precondition is satisfiable may further include determining whether one or more remaining relationships specified in the precondition are satisfiable using one or more relationships stored in the graph database.

The provided method may include identifying, based on the one or more update requests, a set of foundational relationships for storing to the graph database; and inferring, using one or more relationship inference rules, a set of inferred relationships for storing to the graph database based on the set of foundational relationships for storing; and storing, to the graph database, a set of relationships for storing comprising the set of foundational relationships for storing and the set of inferred relationships for storing.

Inferring the set of inferred relationships for storing may include: searching for relationships in the set of foundational relationships for storing that match a relationship specified in a precondition of at least one of the one or more relationship inference rules; determining whether the precondition is satisfiable using at least the matching relationship; and in response to the precondition being satisfiable, inferring at least one of the relationships of the set of inferred relationships for storing using at least the matching relationship.

Inferring the set of inferred relationships for storing may include: setting a storing working set of relationships to the set of foundational relationships for storing to the graph database; while the storing working set of relationships contains at least one relationship: initializing a new storing working set of relationships; for each relationship inference rule of the one or more relationship inference rules: searching for relationships in the storing working set of relationships that match a relationship specified in a precondition of the relationship inference rule; for each matching relationship: determining whether the precondition is satisfiable using at least the matching relationship; in response to the precondition being satisfiable: infer one or more relationships using the relationship inference rule; and updating the new storing working set of relationships based on the inferred one or more relationships; and setting the storing working set of relationships based on the new storing working set of relationships.

Inferring the set of inferred relationships for deletion may include: setting a deletion working set of relationships to the set of foundational relationships for deleting from the graph database; while the deletion working set of relationships contains at least one relationship: initializing a new deletion working set of relationships; for each relationship inference rule of the one or more relationship inference rules: searching for relationships in the deletion working set of relationships that match a relationship specified in a precondition of the relationship inference rule; for each matching relationship: determining whether the precondition is satisfiable using at least the matching relationship;
  in response to the precondition being satisfiable: infer one or more relationships using the relationship inference rule; and updating the new deletion working set of relationships based on the inferred one or more relationships; and setting the deletion working set of relationships based on the new deletion working set of relationships.

Inferring one or more relationships using the relationship inference rule comprises: inferring a set of pre-update inferred relationships based on foundational relationships stored in the graph database and/or relationships inferred therefrom; and inferring a set of post-update inferred relationships based on the difference between foundational relationships stored in the graph database and the set of foundational relationships for deleting, the set of foundational relationships for storing and/or relationships inferred therefrom.

Updating the new storing working set of relationships may include adding, to the new storing working set of relationships, a difference between the set of post-update inferred relationships and the set of pre-update inferred relationships.

Updating the new deletion working set of relationships may include adding, to the new deletion working set of relationships, a difference between the set of pre-update inferred relationships and the set of post-update inferred relationships.

The graph database may be a triplestore.

At least one of the one or more update requests may be received in response to a change in the state of a network. The change in the state of the network may include a network disconnection between two devices. The set of foundation relationships for deletion may include a relationship representing the network connection between the two devices. The set of inferred relationships for deletion may include one or more relationships representing one or more network connections between devices transitively connected by the network connection between the two devices.

A second aspect provides a computer program comprising instructions which, when the program is executed by a computer, cause the computer to carry out any method described above.

A third aspect provides a data processing system comprising one or more processors configured to perform any method described above.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Networked Computer System

Figure 1:
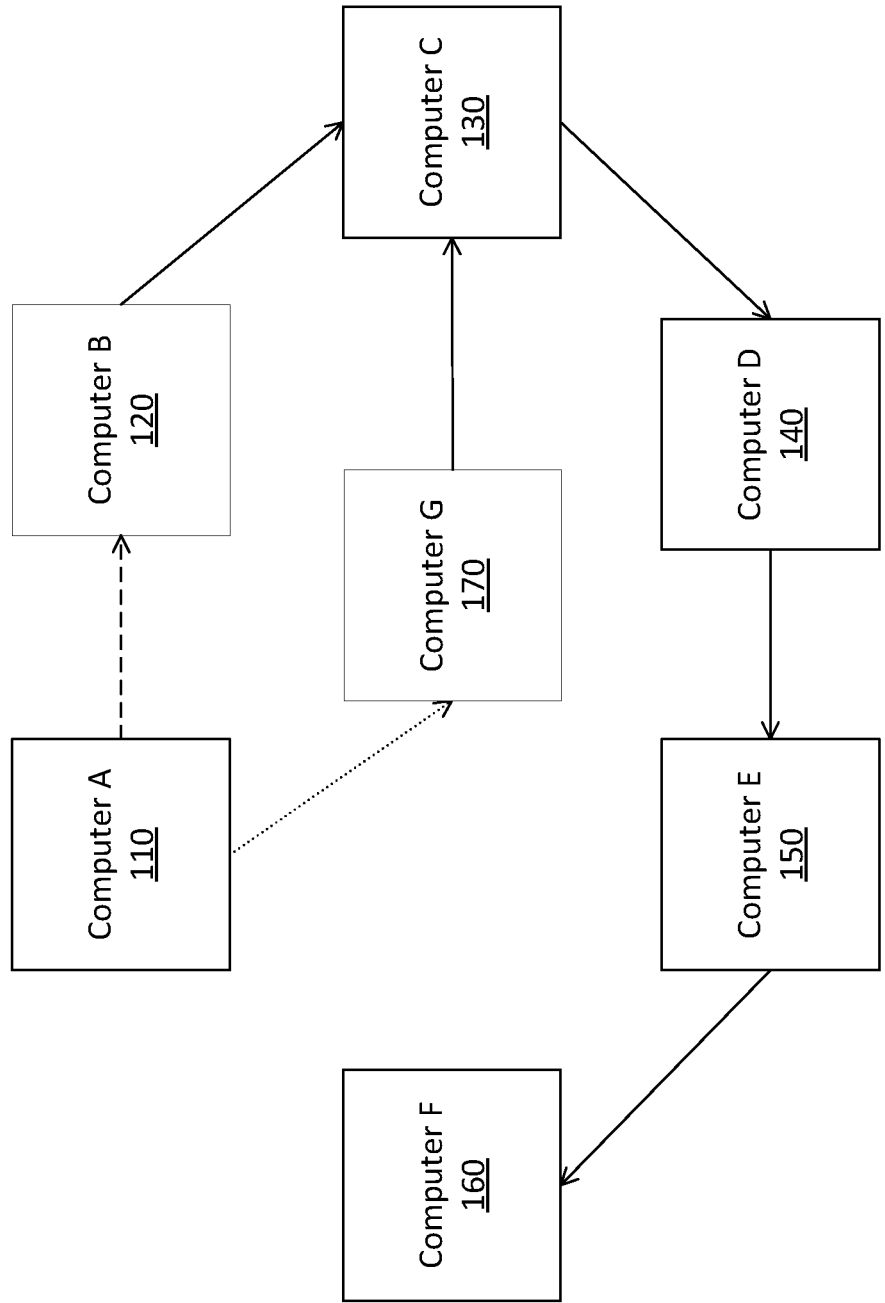
FIG. 1 is a schematic block diagram illustrating a networked computer system analyzable using the systems and methods described herein.

For the purposes of explanation, examples of how the subject innovations may be applied are included herein. These examples relate to using relationships in a graph database to represent connections between computers in a networked computing system. FIG. 1 illustrates such a networked computer system 100.

The example networked computer system 100 includes seven computing devices: Computer A 110, Computer B 120, Computer C 130, Computer D 140, Computer E 150, Computer F 160, and Computer G 170. These computing devices may each be of any type of computing device capable of being connected to a network, e.g. a desktop, a laptop, a router, a mainframe, and/or a smartphone.

The arrows between the computing devices represent network connections between the computing devices. For ease of explanation, the represented network connections are unidirectional, e.g. a first computer being connected to a second computer does not imply that the second computer is connected to the first computer, and the represented network connections are in the directions shown by the respective arrow.

The solid arrows represent connections that are consistently present throughout all of the examples described below. The dashed arrow represents a network connection which is initially present but is subsequently removed, e.g. a network connection that becomes disconnected. The dotted arrow represents a network connection which is not initially present but is subsequently added, e.g. a new network connection between two devices.

Computer A 110 is initially connected to Computer B 120 but is subsequently disconnected from Computer B 120. Computer A 110 is not initially connected to Computer G 170 but is subsequently connected to Computer G. Computer B 120 is connected to Computer C 130. Computer C 130 is connected to Computer D 140. Computer D 140 is connected to Computer E 150. Computer E 150 is connected to Computer F 160. Computer G 170 is connected to Computer C 130.

General Overview

Graph databases represent data using graph structures comprised of nodes and relationships. Nodes are used to represent data items in the database, while relationships represent relationships between these data items. In graph databases, relationships themselves are persisted in the database. This contrasts with many other databases where relationships are inferred at query time using other data. For example, in relational databases, relationships are represented using join keys and join tables which are used at query time to infer relationships.

As the relationships are persisted in the database rather than having to be inferred at query time, traversing relationships in a graph database is comparatively fast compared to traversing relationships in other types of databases, e.g. relational databases. Furthermore, graph databases provide more flexibility than other database types. Graph databases are not bound to a pre-defined structure, and attributes and relationships may be easily added and/or removed.

One type of graph database is known as a triplestore. Triplestores store data as triples. As the name suggests, a triple has three parts. These three parts may be called: the subject, the predicate and the object. The subject of the triple represents the entity performing an action or having a property. The predicate represents the action or the nature of the property. The object describes the entity which the action is being performed to or the value of the property. For example, a triple Computer_A is_connected_to Computer_B represents the fact that Computer A 110 is connected to Computer B 120. While the subject, predicate, object terminology is useful for understanding triples, it should be noted that a triple may also be understood as a directed relationship from a first node to a second node: the first element representing the first node; the second element representing the type of the relationship between the nodes; and the third element representing the second node.

The relationships initially stored in a graph database are derived from external data sources and/or manually inputted by a user. These relationships may be referred to as foundational relationships. Based on these foundational relationships, further nodes and relationships can be derived. These relationships are inferred using rules, whereby each rule defines both a precondition, which is either satisfied or not depending on the relationships present in the graph database, and one or more inferred relationships to be added to the graph database if the precondition is satisfied. The preconditions and inferred relationships may make use of constants and/or variables to designate the nodes to which a precondition is applicable or for which an inferred relationship is to be created: constants reference a specific node, while variables may be matched during inference to any of a plurality of nodes in the graph database. A variable may be referred to several times in a given rule, signifying that all the occurrences of the variable designate a same node of the graph database.

For the purposes of explanation, an example of a rule is given below:

($c1 is_connected_to $c2 and $c2 is_connected_to $c3)⇒
($c1 is_connected_to $c3).

The precondition of the rule is the part of the rule before the implies symbol, ⇒, and the inferred relationship is the part of the rule after the implies symbol. The elements $c1, $c2, and $c3 are variables that are bound to nodes during inference. In the example, the precondition checks whether a first node, bound to the variable $c1, has an is_connected_to relationship with a second node, bound to the variable $c2, and whether this second node has an is_connected_to relationship with a third node, bound to the variable $c3. If the precondition is true for the first node, second node and third node then an inferred relationship, $c1 is_connected_to $c3 is added to the graph database. This inferred relationship indicates that this first node has an is_connected_to relationship with the third node.

The rule may be applied in an example graph database as follows. Consider a graph database storing the following relationships:

Computer_A is_connected_to Computer_B
Computer_B is_connected_to Computer_C
Computer_C is_connected_to Computer_D
Computer_D is_connected_to Computer_E
Computer_E is_connected_to Computer_F.

The rule may be applied to these relationships to infer several further relationships. For example, the precondition is satisfied where: the variable$c1 is bound to Computer_A; the variable $c2 is bound to Computer_B; and the variable $c3 is bound to Computer_C. Therefore, the relationship Computer_A is_connected_to Computer_C is inferred and stored in the graph database. The rule may then be applied again to the contents of the graph database, including the newly added relationship, with at least one of the variables bound to a different node. For example, subsequent to the storing of the inferred relationship Computer_A is_connected_to Computer_C, the precondition is also satisfied where: the variable $c1 is bound to Computer_A; the variable $c2 is bound to Computer_C; and the variable $c3 is bound to Computer D. As a result, the relationship Computer_A is_connected_to Computer_D is inferred and stored in the graph database. This process is repeated until each relationship inferable using the rule has been inferred. For example in this case, the following other relationships would be inferred:

Computer_A is_connected_to Computer_E
Computer_A is_connected_to Computer_F
Computer_B is_connected_to Computer_D
Computer_B is_connected_to Computer_E
Computer_B is_connected_to Computer_F
Computer_C is_connected_to Computer_E
Computer_C is_connected_to Computer_F
Computer_D is_connected_to Computer_F.

As is illustrated by the example above, the outputs of latter inferences are often dependent on previous inferences. Due to these complex interdependencies, inference rules may be applied to foundational relationships in a graph database as a batch operation rather than as a series of incremental operations. Therefore, when the foundational relationships are changed, the existing inferred relationships may be deleted from the database, the foundational relationships updated or refreshed, and the inference rules rerun across the foundational relationships, regardless as to whether they are new or unchanged, to determine an updated set of inferred relationships. As rerunning the inference rules across the foundational relationships is computationally expensive, updates may be applied to the graph database infrequently, e.g. once a day or less.

Applying updates to the graph database infrequently may be acceptable for offline analysis of data, e.g. post hoc analysis of a network system. However, if online or near online analysis of data is desired, e.g. analysis of the current or recent state of a network system, frequent updating of the graph database is unavoidable. For such frequent updates, rerunning the inference rules across the foundational relationships would use an excessive amount of computational resources. The use of such an excessive amount of computational resources would greatly increase the hardware requirements for such a system and/or increase the time to perform the update such that the system was still not suited to online analysis. Therefore, a method for reducing the computational resources used to update graph databases is desirable.

The subject innovations relate to providing system and methods to reduce the computational resources used to update graph databases. These systems and methods may be particularly applicable when online or near online data analysis using a graph database is desired, e.g. online analysis of networked computer systems, such as the networked computer system 100.

Deletion Method

Figure 2:
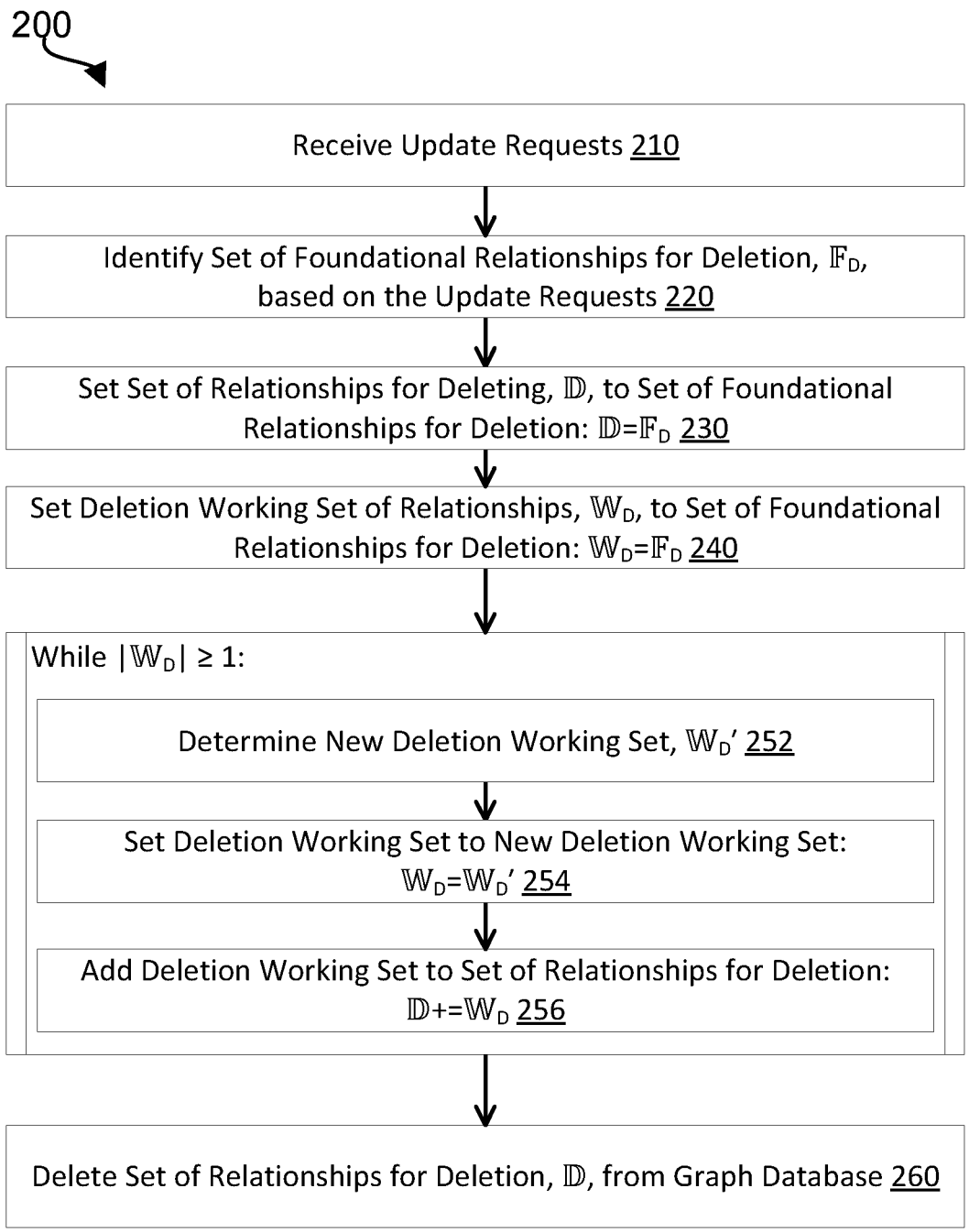
FIG. 2 is a flow diagram of an example method for deleting relationships from a graph database.

FIG. 2 is a flow diagram of an example method 200 for deleting relationships from a graph database. The method may be performed by executing computer-readable instructions using one or more computing devices.

In step 210, update request(s) are received. These update request(s) may be messages received using a message queue, input from a user and/or retrieved by polling a data source, e.g. a database or file, to determine any changes. These update requests contain information from which foundational relationships to delete from the graph database can be identified.

In step 220, the set of foundational relationship(s) for deleting from the graph database, $\mathbb{F}_D$, are identified from the update request. The set of foundational relationship(s) for deleting may be identified by analyzing the received update requests and determining which of these update requests relate to one or more deletions. The set of foundational relationships for storing may be stored in one or more appropriate data structures, e.g. an array, a linked list or a set data structure.

In step 230, the set of relationships for deletion, $\mathbb{D}$, is initially set to the foundational relationship(s) for deletion, i.e. $\mathbb{D} = \mathbb{F}_D$. This may be phrased as initially setting the set of relationships for deletion, $\mathbb{D}$, to the foundational relationship(s) for deletion.

In step 240, a deletion working set of relationships, $\mathbb{W}_D$, is created and initially set to the foundational relationship(s) for deletion, i.e. $\mathbb{W}_D = \mathbb{F}_D$. This may be phrased as creating the deletion working set of relationships and setting the deletion working set to the foundational relationship(s) for deletion.

While the deletion working set of relationships contains at least one relationship, e.g. while the deletion working set of relationships is not the empty set, the steps 252, 254 and 256 are iterated. This while condition may be represented in mathematical notation as $|\mathbb{W}_D| \geq 1$, as illustrated in FIG. 2.

In step 252, a new deletion working set of relationships, $\mathbb{W}_D'$, is determined. The new deletion working set of relationships is determined such that it contains those relationships inferable, by one or more relationship inference rules, using the existing deletion working set of relationships, $\mathbb{W}_D$. An example method of how the new deletion working set of relationships, $\mathbb{W}_D'$, may be determined is described in relation to FIG. 3.

In step 254, the deletion working set of relationships is then set to the new deletion working set of relationships, i.e. $\mathbb{W}_D = \mathbb{W}_D'$. This may be phrased as setting the deletion working set of relationships to the new deletion working set of relationships.

In step 256, the deletion working set of relationships is added to the set of relationships for deletion, i.e. $\mathbb{D}\ +=\mathbb{W}_D$.

After the steps 252, 254, 256 have been iterated in accordance with the 'while' condition described above, the set of relationships for deletion, $\mathbb{D}$, includes the foundational relationships for deletion, $\mathbb{F}_D$, and the relationships inferred from them.

In step 260, the set of relationships for deletion, $\mathbb{D}$, is deleted from the graph database.

The described deletion method 200 considerably reduces the computational resources used when deleting data from a graph database compared to existing methods. Unlike existing methods, where the rules are rerun across all foundational relationships in a graph database, the inference rules are specifically run on the foundational relationships for deletion and the relationships derived from these. Therefore, the number of inferences to be performed is substantially reduced. Each of these inferences uses computational resources, hence, the amount of computational resources used is also substantially reduced.

New Deletion Working Set Determination Method

Figure 3:
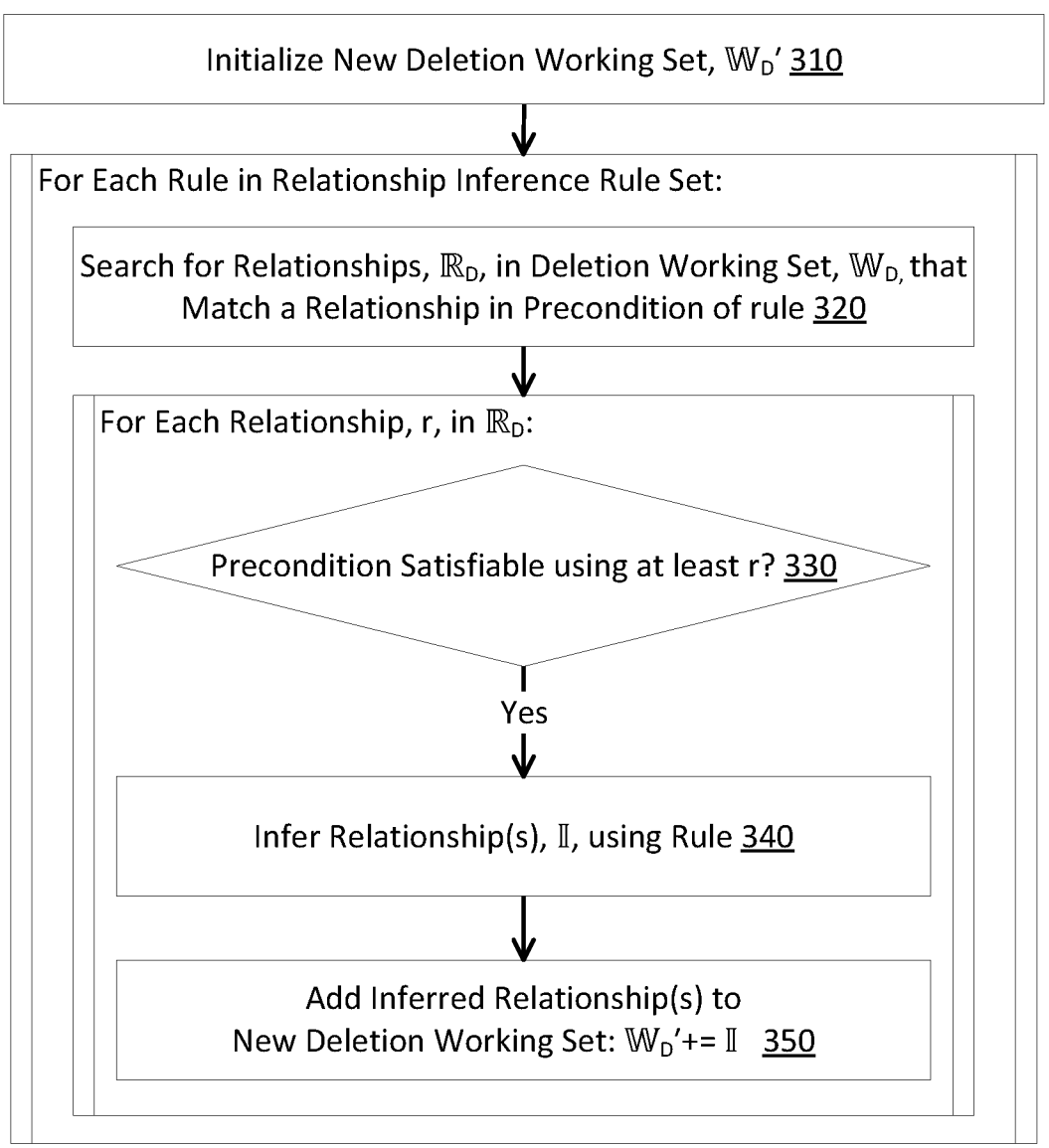
FIG. 3 is a flow diagram of an example method for determining a new deletion working set of relationships.

FIG. 3 is a flow diagram of an example method 252 for determining a new deletion working set of relationships, $\mathbb{W}_D'$, and may be utilized as part of the deletion method 200 described in relation to FIG. 2.

For the purposes of illustration, examples of how the steps of this method 300 may be applied to data representing the networked computer system 100 are included. In this example, the initial set of foundational relationships includes at least:

Computer_A is_connected_to Computer_B
Computer_B is_connected_to Computer_C.

The foundational relationship for deletion in this example is:

Computer_A is_connected_to Computer_B.

In step 310, a new deletion working set of relationships, $\mathbb{W}_D'$, is initialized, e.g. an empty data structure for containing relationships is created.

The following steps are performed for each rule in a set of relationship inference rules.

In the example, the set of relationship inference rules includes a single rule, which is the rule described above, i.e.:

($c1 is_connected_to $c2 and $c2 is_connected_to $c3)⇒
($c1 is_connected_to $c3).

In step 320, the deletion working set of relationships, $\mathbb{W}_D$, is searched for any relationships which match a relationship specified by the precondition of the rule. These matching relationships may be referred to as the set of deletion matching relationships, $\mathbb{R}_D$. If no matching relationships are found then execution immediately proceeds to the next iteration, e.g. searching for any relationships which match a relationship specified by the precondition of the next rule.

In the example, the relationship Computer_A is_connected_to Computer_B is matched with the relationship specified by the precondition:

$c1 is_connected to $c2.

The following steps are then performed for each relationship, r, in the set of matching relationships, $\mathbb{R}_D$.

In step 330, it is determined whether the precondition is satisfiable when at least the relationship, r, is matched with the relationship specified by the precondition. To make this determination, any variables specified by the matching relationship of the precondition are bound to the values of the relationship and, then, it is determined whether the remaining relationships specified by the precondition are satisfiable by relationships in the initial foundational set of relationships stored in the graph database and/or in the deletion working set of relationships. If so, the relationships specified by the precondition are matched to those relationships that satisfy the precondition, and the variables in the precondition correspondingly bound. If the remaining relationships specified by the precondition are not satisfiable then execution immediately proceeds to the next iteration, e.g. determining whether the precondition is satisfiable when a next relationship, r', in the set of matching relationships, $\mathbb{R}$, is matched with the relationship specified by the precondition.

In the example, the variables $c1 and $c2 have been bound to Computer_A and Computer_B, respectively. With these bindings, the precondition of the rule is:

(Computer_A is_connected_to Computer_B and
Computer_B is_connected_to $c3).

Therefore, for this precondition to be satisfied, a relationship specifying that Computer_B is connected to another computer, $c3, should be found. In this case, one such relationship is present, Computer_B is_connected_to Computer_C. As a result, $c3, is bound to Computer_C.

In step 340, new relationship(s), $\mathbb{I}$, are inferred using the rule based on the relationships to which the precondition is matched and the values to which the variables are bound to as a result.

In the example, the variables $c1, $c2, and $c3 are bound to Computer_A, Computer_B, and Computer_C, respectively. Therefore, the rule is applied as follows:

(Computer_A is_connected_to Computer_B
and Computer_B is_connected_to Computer_C)⇒
Computer_A is_connected_to Computer_C).

In the example, the relationship Computer_A is_connected_to Computer_C is inferred.

In step 350, the inferred relationship(s), $\mathbb{I}$, are added to the new deletion working set, $\mathbb{W}_D'$, i.e.: $\mathbb{W}_D' += \mathbb{I}$.

As previously indicated, once the inference function steps have been repeated for each of the one or more relationships in the deletion working set that can be matched, the relationship determination steps are performed again for the next rule until the relationship determination steps have been performed for each rule.

The described method 300 substantially reduces the computational resources used in determining whether the rule is satisfiable. This is because a relationship specified by the rule is first matched with a relationship in the deletion working set and variables correspondingly bound. By pre-binding these variables, the number of relationships to be searched to determine whether the rule is satisfiable is greatly reduced. For example, in the example described above, the relationship $c1 is_connected_to $c2 may be matched with the relationship Computer_A is_connected_to Computer_B with $c1 bound to Computer_A and $c2 bound to Computer_B. With these variables bound, the precondition of the rule is:

(Computer_A is_connected_to Computer_B and
Computer_B is_connected_to $c3).

As $c2 is already bound, the relationships to be searched to determine whether the precondition is satisfiable are those where Computer_B is the first element, e.g. the subject, rather than having to search all or at least a significant proportion of the is_connected_to relationships in the graph database.

Storing Method

Figure 4:
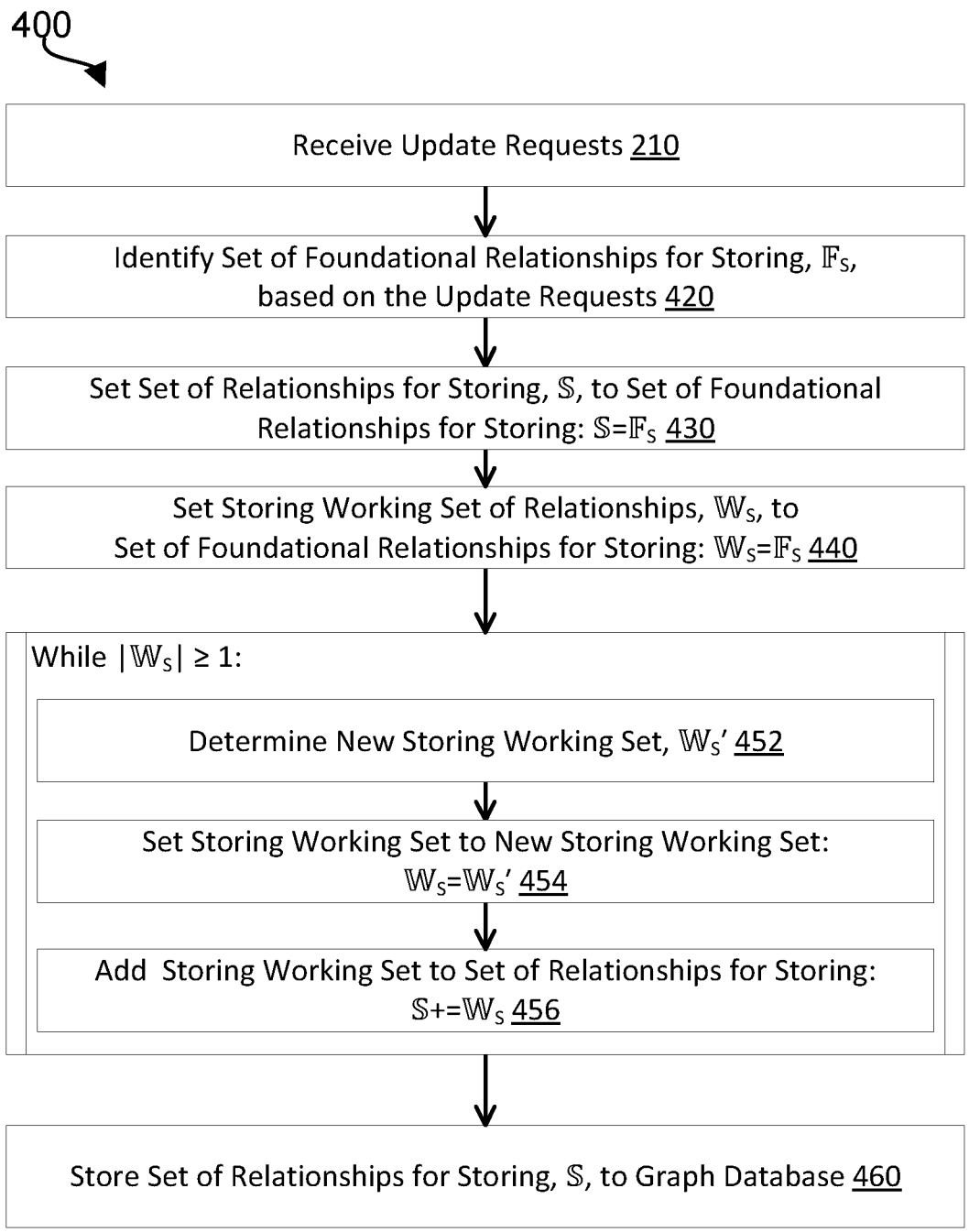
FIG. 4 is a flow diagram of an example method for storing relationships to a graph database.

FIG. 4 is a flow diagram of an example method 400 for storing relationships to a graph database. The method may be performed by executing computer-readable instructions using one or more computing devices.

As for the storing method 200, the step 210 is performed, i.e. update request(s) are received.

In step 420, the set of foundational relationship(s) for storing to the graph database, $\mathbb{F}_S$, are identified from the update request. The set of foundational relationship(s) for storing may be identified by analyzing the received update requests and determining which of these update requests relate to storing one or more foundational relationships. The set of foundational relationships for storing may be stored in one or more appropriate data structures, e.g. an array, a linked list or a set data structure.

In step 430, the set of relationships for storing, $\mathbb{S}$, is initially set to the foundational relationship(s) for storing, i.e. $\mathbb{S} = \mathbb{F}_S$. This may be phrased as initially setting the set of relationships for storing to the foundational relationship(s) for storing.

In step 440, a storing working set of relationships, $\mathbb{W}_S$, is created and initially set to the foundational relationship(s) for storing, i.e. $\mathbb{W}_S = \mathbb{F}_S$. This may be phrased as creating, e.g. initializing, a storing working set of relationships and setting it to the foundational relationship(s) for storing.

While the storing working set of relationships contains at least one relationship, e.g. while the storing working set of relationships is not the empty set, the steps 452, 454 and 456 are iterated. This while condition may be represented in mathematical notation as $|\mathbb{W}_S| \geq 1$, as illustrated in FIG. 4.

In step 452, a new storing working set of relationships, $\mathbb{W}_S'$, is determined. The new storing working set of relationships is determined such that it contains those relationships inferable, by one or more relationship inference rules, using the existing storing working set of relationships, $\mathbb{W}_S$. An example method of how the new storing working set of relationships, $\mathbb{W}_S'$, may be determined is described in relation to FIG. 3.

In step 454, the storing working set of relationships is then set to the new storing working set of relationships, i.e. $\mathbb{W}_S = \mathbb{W}_S'$. This may be phrased as setting the new storing working set of relationships to the storing working set of relationships.

In step 456, the storing working set of relationships is added to the set of relationships for storing, i.e. $\mathbb{S} += \mathbb{S}_S'$.

After the steps 452, 454, 456 have been iterated in accordance with the 'while' condition described above, the set of relationships for storing, $\mathbb{S}$, includes the foundational relationships for storing, $\mathbb{F}_S$, and the relationships inferred from them.

In step 460, the set of relationships for storing, $\mathbb{S}$, is stored to the graph database.

The described storing method 400 considerably reduces the computational resources used when storing data to a graph database compared to existing methods. Unlike existing methods, where the rules are rerun across all foundational relationships in a graph database, the inference rules are specifically run on the foundational relationships for storing and the relationships derived from these. Therefore, the number of inferences to be performed is substantially reduced. Each of these inferences uses computational resources, hence, the amount of computational resources used is also substantially reduced.

Storing Working Set Determination Method

Figure 5:
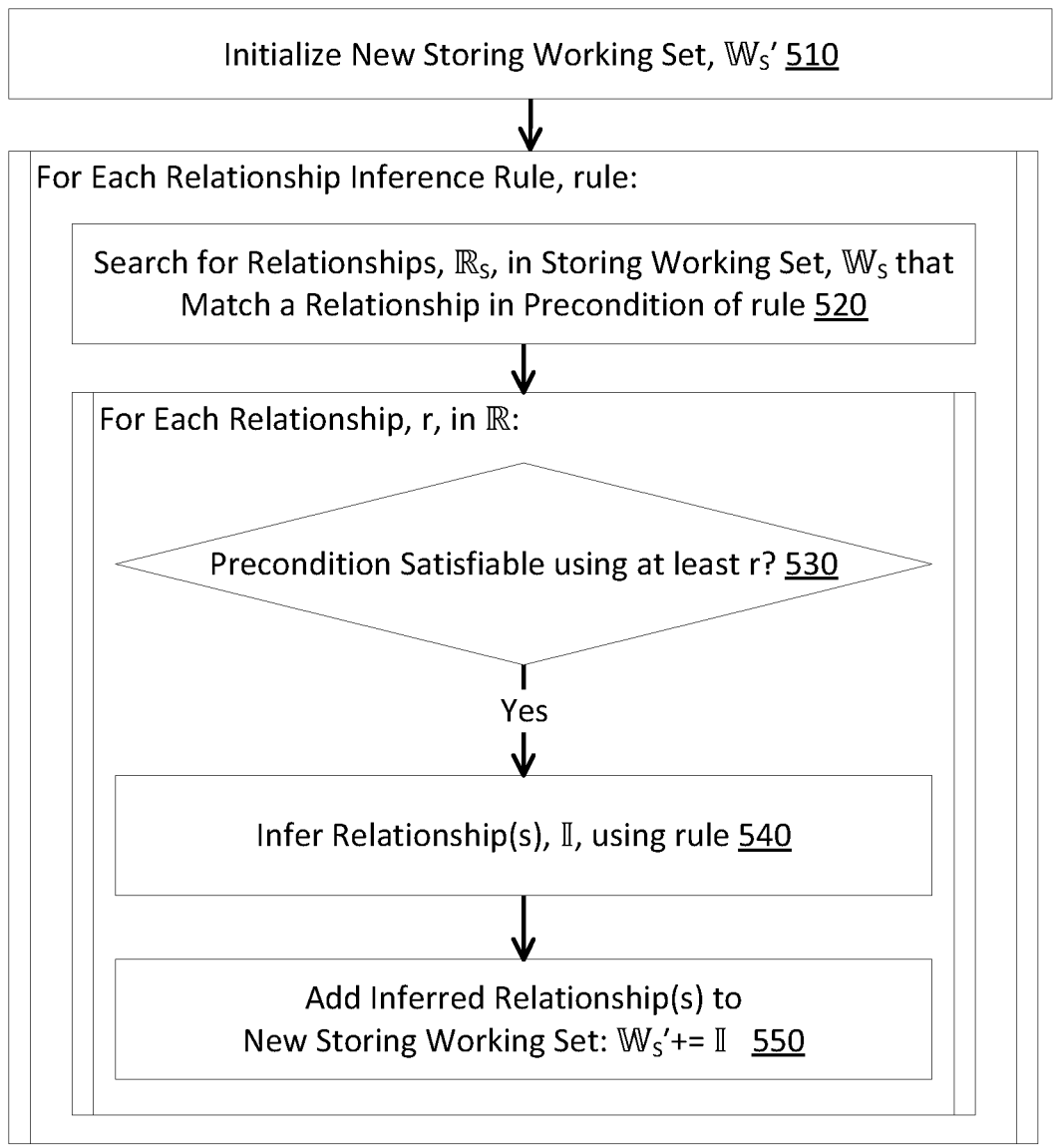
FIG. 5 is a flow diagram of an example method for determining a new storing working set.

FIG. 5 is a flow diagram of an example method 452 for determining a new storing working set of relationships, $\mathbb{W}_S'$, and may be utilized as part of the storing method 400 described in relation to FIG. 4.

For the purposes of illustration, examples of how the steps of this method 500 may be applied to data representing the networked computer system 100 are included. In this example, the initial set of foundational relationships includes at least:

Computer_B is_connected_to Computer_C
Computer_G is_connected_to Computer_C.

The foundational relationship for storing in this example is:

Computer_A is_connected_to Computer_G.

In step 510, a new storing working set of relationships, $\mathbb{W}_S'$, is initialized, e.g. an empty data structure for containing relationships is created.

The following steps are performed for each rule in a set of relationship inference rules.

In the example, the set of relationships rule includes a single rule, which is the rule described above, i.e.:

($c1 is_connected_to $c2 and $c2 is_connected_to $c3)⇒
($c1 is connected to $c3).

In step 520, the storing working set of relationships, $\mathbb{W}_S$, is searched for any relationships which match a relationship specified by the precondition of the rule. These matching relationships may be referred to as the set of storing matching relationships, $\mathbb{R}_S$. If no matching relationships are found then execution immediately proceeds to the next iteration, e.g. searching for any relationships which match a relationship specified the precondition of the next rule.

In the example, the relationship Computer_A is_connected_to Computer_G is matched with the relationship specified by the precondition:

$c1 is_connected_to $c2.

The following steps are then performed for each relationship, r, in the set of storing matching relationships, $\mathbb{R}_S$.

In step 530, it is determined whether the precondition is satisfiable when at least the relationship, r, is matched with the relationship specified by the precondition. To make this determination, any variables specified by the matching relationship of the precondition are bound to the values of the relationship and, then, it is determined whether the remaining relationships specified by the precondition are satisfiable by relationships in the initial foundational set of relationships and/or in the storing working set of relationships. If so, the relationships specified by the precondition are matched to those relationships that satisfy the precondition, and the variables in the precondition correspondingly bound. If the remaining relationships specified by the precondition are not satisfiable then execution immediately proceeds to the next iteration, e.g. determining whether the precondition is satisfiable when a next relationship, r', in the set of matching relationships, $\mathbb{R}$, is matched with the relationship specified by the precondition.

In the example, the variables $c1 and $c2 have been bound to Computer_A and Computer_G, respectively. With these bindings, the precondition of the rule is:

(Computer_A is_connected_to Computer_C and
Computer_G is_connected_to $c3).

Therefore, for this precondition to be satisfied, a relationship specifying that Computer_G is connected to another computer, $c3, should be found. In this case, one such relationship is present, Computer_G is_connected_to Computer_C. As a result, $c3, is bound to Computer_C.

In step 540, new relationship(s), $\mathbb{I}$, are inferred using the rule based on the relationships to which the precondition is matched and the values to which the variables are bound to as a result.

In the example, the variables $c1, $c2, and $c3 are bound to Computer_A, Computer_C, and Computer_G, respectively. Therefore, the rule is applied as follows:

(Computer_A is_connected_to Computer_G
and Computer_G is_connected_to Computer_C)=
Computer_A is_connected_to Computer_G).

In the example, the relationship Computer_A is_connected_to Computer_C is inferred.

In step 550, the inferred relationship(s), $\mathbb{I}$, are added to the new storing working set, $\mathbb{W}_S'$, i.e.: $\mathbb{W}_S'+=\mathbb{I}$.

As previously indicated, once the inference function steps have been repeated for each of the one or more relationships in the storing working set that can be matched, the relationship determination steps are performed again for the next rule until the relationship determination steps have been performed for each rule.

The described method 500 substantially reduces the computational resources used in determining whether the rule is satisfiable for the same reasons as the described method 300.

Update Method

Figure 6:
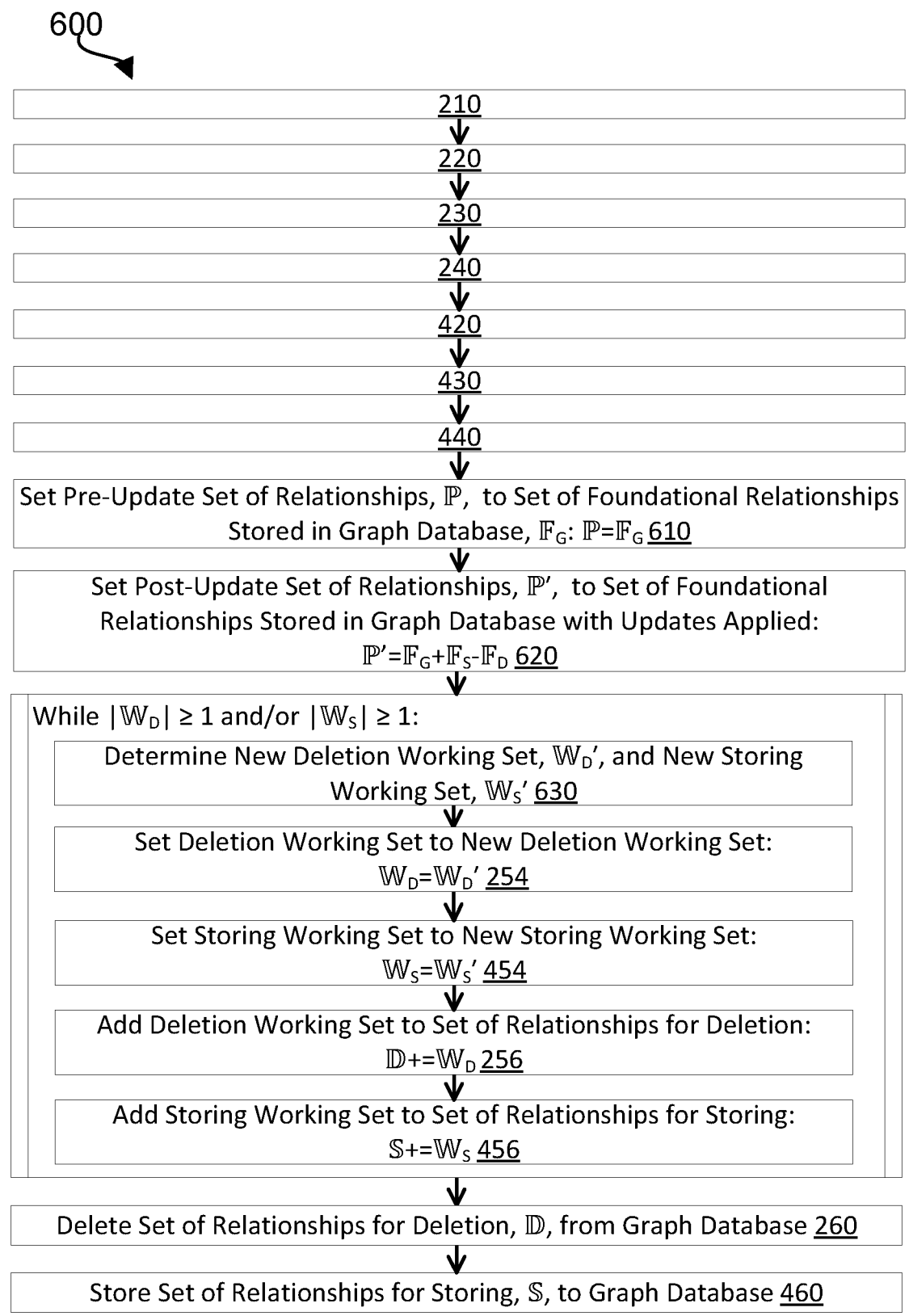
FIG. 6 is a flow diagram of an example method for updating a graph database.

FIG. 6 is a flow diagram of an example method 600 for updating a graph database. The method may be performed by executing computer-readable instructions using one or more computing devices.

In step 210, update request(s) are received, as described in relation to the method 200 and method 400.

In step 220, the set of foundational relationship(s) for deleting from the graph database, $\mathbb{F}_D$, are identified from the update request, as described in relation to the method 200.

In step 230, the set of relationships for deletion, $\mathbb{D}$, is initially set to the foundational relationship(s) for deletion, i.e. $\mathbb{D}=\mathbb{F}_D$, as described in relation to the method 200.

In step 240, a deletion working set of relationships, $\mathbb{W}_D$, is created and initially set to the foundational relationship(s) for deletion, i.e. $\mathbb{W}_D=\mathbb{F}_D$, as described in relation to the method 200.

In step 420, the set of foundational relationship(s) for storing to the graph database, $\mathbb{F}_S$, are identified from the update request, as described in relation to the method 400.

In step 430, the set of relationships for storing, $\mathbb{S}$, is initially set to the foundational relationship(s) for storing, i.e. $\mathbb{S}=\mathbb{F}_S$, as described in relation to the method 400.

In step 440, a storing working set of relationships, $\mathbb{W}_S$, is created and initially set to the foundational relationship(s) for storing, i.e. $\mathbb{W}_S=\mathbb{F}_S$, as described in relation to the method 400.

In step 610, a pre-update set of relationships, $\mathbb{P}$, is set to the set of foundational relationships stored in the graph database, $\mathbb{F}_G$, e.g. the set of foundational relationships in the graph database before the update has been applied.

In step 620, a post-update set of relationships, $\mathbb{P}$, is set to the set of foundational relationships stored in the graph database with the updates to the foundational relationships applied. For example, the set of foundational relationships stored in the graph database, $\mathbb{F}$ G, with the foundational relationships for storing, $\mathbb{F}_S$, added and the foundational relationships for deletion, $\mathbb{F}_D$, removed, i.e.: $\mathbb{P}'=\mathbb{F}_G+\mathbb{F}_S-\mathbb{F}_D$.

While either or both of the deletion working set of relationships or the storing working set of relationships contains at least one relationship, e.g. while at least one of the deletion working set or the storing working set is not the empty set, the steps 630, 254, 454, 256, and 456 are iterated. This while condition may be represented in mathematical notation as '| $\mathbb{W}_D$|≥1 and/or | $\mathbb{W}_S$|≥1', as illustrated in FIG. 6.

In step 630, the new deletion working set of relationships, $\mathbb{W}_D'$, and the new storing working set of relationships, $\mathbb{W}_S'$, are determined. The new deletion working set of relationships is determined such that it contains those relationships inferable, by one or more relationship inference rules, from the storing working set, $\mathbb{W}_D$, prior, but not subsequent, to the updating of the foundational relationships in the graph database. The new storing working set of relationships is determined such that it contains those relationships inferable, by one or more relationship inference rules, from the storing working set, $\mathbb{W}_S$, subsequent, but not prior, to the updating of the foundational relationships in the graph database. An example method of how the new deletion working set of relationships, $\mathbb{W}_D'$, and the new storing working set of relationships, $\mathbb{W}_S'$, are determined is described in relation to FIG. 7.

In step 254, the deletion working set of relationships is then set to the new deletion working set of relationships, i.e. $\mathbb{W}_D=\mathbb{W}_D'$.

In step 454, the storing working set of relationships is then set to the new storing working set of relationships, i.e. $\mathbb{W}_S=\mathbb{W}^{S'}$.

In step 256, the deletion working set of relationships is added to the set of relationships for deletion, i.e. $\mathbb{D}+=\mathbb{W}_D$.

In step 456, the storing working set of relationships is added to the set of relationships for storing, i.e. $\mathbb{S}+=\mathbb{W}_S$.

After the steps 630, 254, 454, 256 and 456 have been iterated in accordance with the 'while' condition described above, the set of relationships for deletion, $\mathbb{D}$, includes the foundational relationships for deletion, $\mathbb{F}_D$, and the relationships inferred from them except for any relationships which would still be inferred due to the addition of the foundational relationships for storing. Likewise, the set of relationships for storing includes the foundational relationships for storing, $\mathbb{F}_S$, and the relationships inferred from them, except for any relationships which would not be inferred due to the removal of the foundational relationships for deletion.

In step 260, the set of relationships for deletion, $\mathbb{D}$, is deleted from the graph database, as described in relation to the method 200.

In step 460, the set of relationships for storing, $\mathbb{S}$, is stored to the graph database, as described in relation to the method 400.

New Deletion Working Set and New Storing Working Set Determination Method

Figure 7:
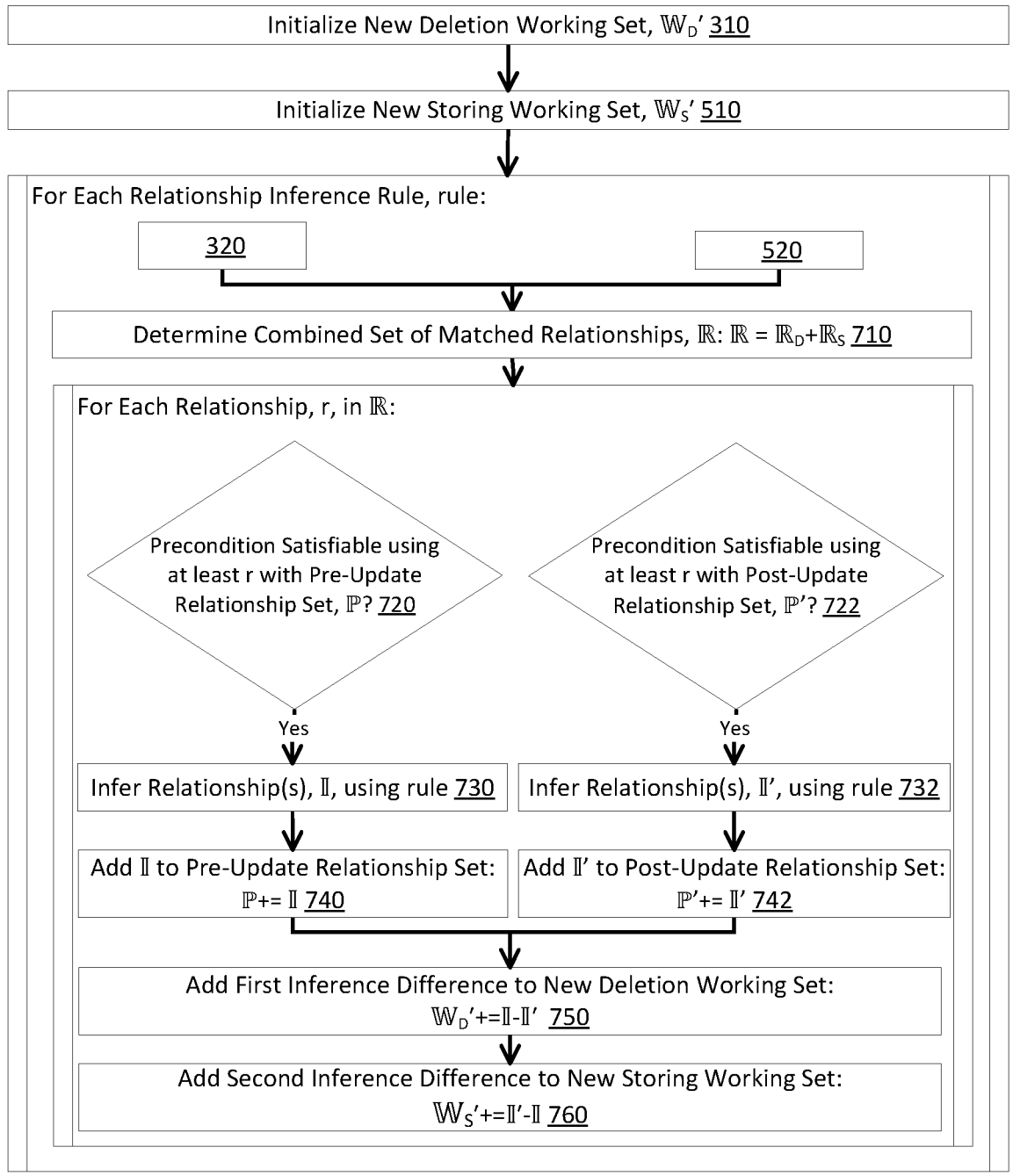
FIG. 7 is a flow diagram of an example method for determining a new storing working set and determining a new deletion working set.

FIG. 7 is a flow diagram of an example method 630 for determining a new deletion working set of relationships, $\mathbb{W}_D'$, and a new storing working set of relationships, $\mathbb{W}_S'$, and may be utilized as part of the update method 600 described in relation to FIG. 6.

In step 310, a new deletion working set of relationships, $\mathbb{W}_D'$, is initialized, e.g. an empty data structure for containing relationships is created.

In step 510, a new storing working set of relationships, $\mathbb{W}_S'$, is initialized, e.g. an empty data structure for containing relationships is created.

The following steps are performed for each rule in a set of relationship inference rules.

In step 320, the deletion working set of relationships, $\mathbb{W}_D$, is searched for any relationships which match a relationship specified by the precondition of the rule. These matching relationships may be referred to as the set of deletion matching relationships, $\mathbb{R}_D$.

In step 520, the storing working set of relationships, $\mathbb{W}_S$, is searched for any relationships which match a relationship specified by the precondition of the rule. These matching relationships may be referred to as the set of storing matching relationships, $\mathbb{R}_S$.

In step 710, a combined set of matched relationships, $\mathbb{R}$, is determined, e.g. the union or sum of the set of deletion matching relationships. This may be represented in mathematical notation as $\mathbb{R} = \mathbb{R}_D + \mathbb{R}_S$ or as $\mathbb{R} = \mathbb{R}_D \cup \mathbb{R}_S$.

The following steps are then performed for each relationship, r, in the set of matching relationships, $\mathbb{R}$.

In step 720, it is determined whether the precondition is satisfiable when at least the relationship, r, is matched with the relationship specified by the precondition. To make this determination, any variables specified by the matching relationship of the precondition are bound to the values of the relationship and, then, it is determined whether the remaining relationships specified by the precondition are satisfiable by relationships in the pre-update set of relationships, $\mathbb{P}$. If so, the relationships specified by the precondition are matched to those relationships that satisfy the precondition, and the variables in the precondition correspondingly bound.

In step 730, a set of pre-update inferred relationships, $\mathbb{I}$, is inferred using the rule based on the relationships to which the precondition is matched and the values to which the variables are bound to as a result.

In step 740, the set of pre-update inferred relationships, $\mathbb{I}$, is added to the pre-update set of relationships, $\mathbb{P}$, i.e. $\mathbb{P} += \mathbb{I}$.

In step 722, it is determined whether the precondition is satisfiable when at least the relationship, r, is matched with the relationship specified by the precondition. To make this determination, any variables specified by the matching relationship of the precondition are bound to the values of the relationship and, then, it is determined whether the remaining relationships specified by the precondition are satisfiable by relationships in the post-update set of relationships, $\mathbb{P}'$. If so, the relationships specified by the precondition are matched to those relationships that satisfy the precondition, and the variables in the precondition correspondingly bound.

In step 732, a set of post-update inferred relationships, $\mathbb{I}'$, is inferred using the rule based on the relationships to which the precondition is matched and the values to which the variables are bound to as a result.

In step 742, the set of post-update inferred relationships, $\mathbb{I}'$, is added to the post-update set of relationships, $\mathbb{P}'$, i.e. $\mathbb{P}' += \mathbb{I}'$.

In step 750, a first inference difference, $\mathbb{I} - \mathbb{I}'$, between the set of pre-update inferred relationships, $\mathbb{I}$, the set of post-update inferred relationships, $\mathbb{I}'$, is determined, and this first difference is added to the new deletion working set of relationships, $\mathbb{W}_D'$, i.e. $\mathbb{W}_D' += \mathbb{I} - \mathbb{I}'$.

In step 760, a second inference difference, $\mathbb{I}' - \mathbb{I}$, between the set of post-update inferred relationships, I', the set of pre-update inferred relationships, $\mathbb{I}$, is determined, and this first difference is added to the new storing working set of relationships, $\mathbb{W}_S'$, i.e. $\mathbb{W}_S' += \mathbb{I}' - \mathbb{I}$.

Using the method described above to determine the new deletion working set and the new storing working set, fewer inference operations may be performed as by using the differences between the set of pre-update inferred relationships and the set of post-update inferred relationships, as described, at least some unnecessary inferences are forestalled. Some unnecessary inferences are forestalled at least because where new relationship(s) are to be stored that, for the purposes of the inference rule(s), replace other relationship(s) for deletion, the (same) relationships inferred from each of these may not be added to the storing working sets and deletion working sets before further (corresponding) relationships are needlessly inferred for both deletion and storing.

This may be particularly applicable where the inferred and foundational relationships stored in the graph database represent a network, e.g. a telephone or computer network, as such networks typically include transitive relationships. For example, as shown in the networked computer system 100, a connection between Computer A 110 and Computer B 120 may be removed, through which Computer A 110 is indirectly connected to a number of other computers: Computer C 130, Computer D 140, Computer E 150, and Computer 160. However, a connection from Computer A 110 to Computer G 170, which is itself connected to Computer C 130, may be established substantially contemporaneously. The described method would facilitate the updating of a graph database representing the networked computer system 100, such that the relationship representing the connection between Computer A 110 and Computer B 120 is removed, and a relationship representing connection between Computer G 170 and Computer C 130 is added, without performing unnecessary inference operations relating to the computers which Computer A 110 remains indirectly connected to. This is at least because a relationship Computer_A is_connected_to Computer_C would be inferred using both the pre-update set of relationships and the post-update set of relationships, hence this relationship would not be added to the new deletion working set of relationships or the new storing working set of relationship. Therefore, the relationship Computer_A is_connected_to Computer_C would not be present in the working sets for the next iteration and no further relationships would (needlessly) be inferred from it.

Graph Database Updating System

Figure 8:
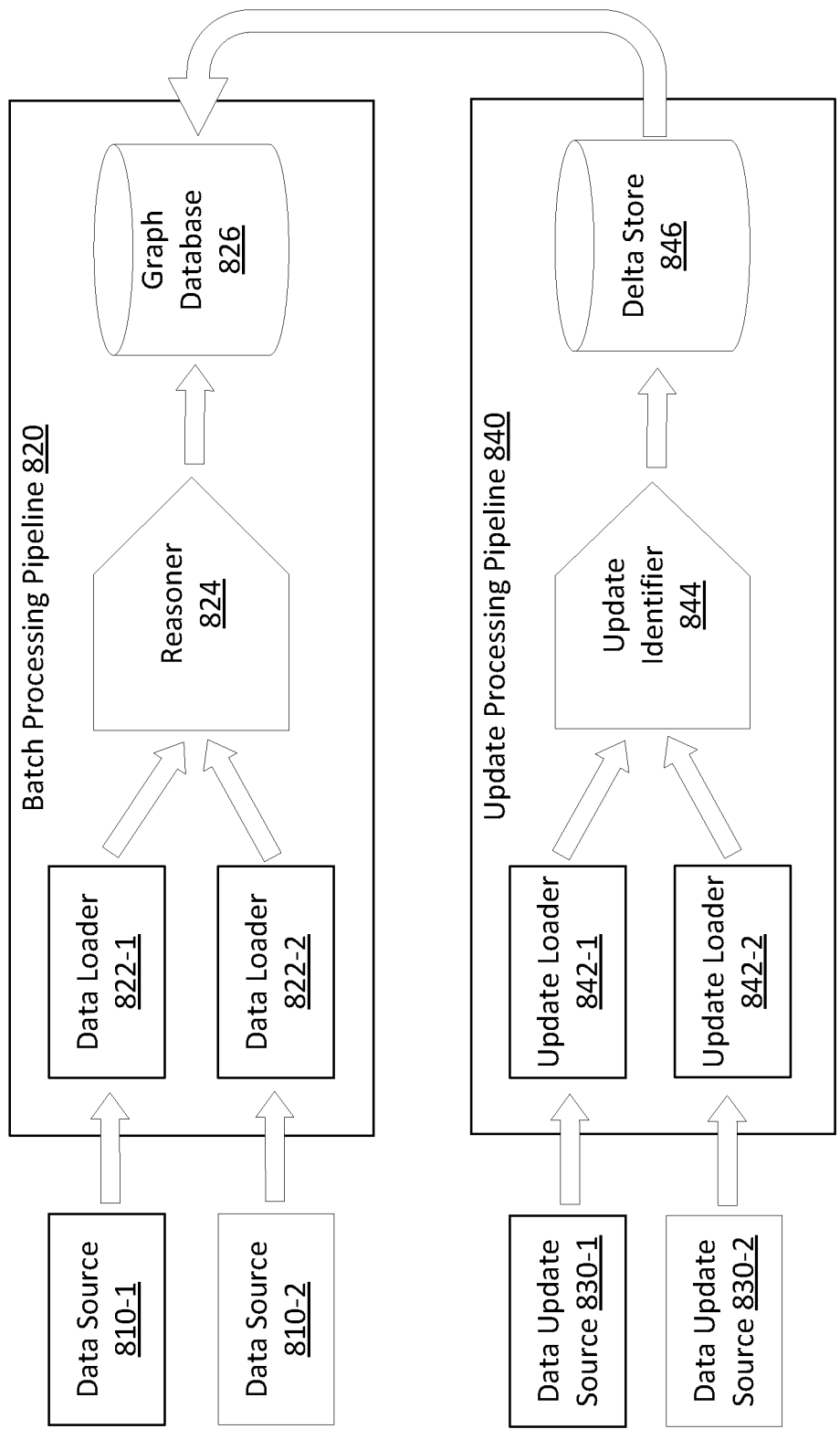
FIG. 8 is a schematic block diagram illustrating a computer system configured to update a graph database.

Referring to FIG. 8, a computer system 800 for updating a graph database is shown. The described computer system may be implemented on any suitable computing device, across several networked computing devices, and/or on a cloud computing system. For example, the computer system 800 may be implemented by one or more computing devices of the type described with respect to FIG. 9.

The graph database system includes data sources 810-1, 810-2, a batch processing pipeline 820, data update sources 830-1, 830-2, and an update processing pipeline 840.

The data sources 810-1, 810-2 are used as inputs to the batch processing pipeline 820. These data sources may comprise data that is updated infrequently, e.g. historical network activity data, or a database of network hardware properties. These data sources may be in a stored in a manner suitable for batch processing, e.g. as a flat file or in binary large object storage.

The batch processing pipeline 820 is configured to perform an initial load or a reload of a graph database 826 from data sources 810-1 suited for batch processing. The batch processing pipeline 820 is configured to be run infrequently, e.g. daily or weekly. The batch processing pipeline includes data loaders 822-1, 822-2, a reasoner 824, and a graph database 826.

The data loaders 822-1, 822-2 are software configured to load data from the respective data sources 810-1, 810-2 and convert and output the loaded data into a form suitable for processing by the reasoned 824. For example, the data loaders 822-1, 822-2, may convert the loaded data into triples or another representation of a relationship between two nodes, e.g. a tuple.

The output of the data loaders 822-1 is then processed by the reasoner 824 which applies relationship inference rules to infer further relationships from the relationships in the loaded data. Both the relationships output by the data loader and these determined further relationships are then stored to the graph database 826.

The graph database 826 may be any database suitable for storing relationships. For example, the graph database 826 may be a triplestore, e.g. a resource description framework store, another type of native graph database, e.g. a labelled property graph database, or any database configured to store relationships.

The data update sources 830-1, 830-2 are used as inputs to the update processing pipeline 840. These update data sources 830-1, 830-2 may comprise data that is updated frequently, e.g. data representing recent changes to the state of a network, e.g. changes occurring within the last minute, last ten minutes or the last hour. These data update sources 830-1, 830-2 may be data storage systems and/or software adapted for supplying data frequently, e.g. a message queue, an event queue, or a web service request receiver.

The data update loaders 842-1, 842-2 are software configured to load data updates from the respective data update sources 830-1, 830-2 and convert and output the loaded data updates into a form suitable for processing by the update identifier. For example, the data update loaders 842-1, 842-2, may convert the loaded data update into triples or another representation of a relationship between two nodes, e.g. a tuple.

The output of the data loaders 822-1 is then processed by the update identifier 844 which applies relationship inference rules in accordance with the above-described methods to determine inferred relationships for storing to and/or deleting from the graph database 826. These inferred relationships for storing to and/or deleting from the graph database 826 may be referred to as deltas.

The deltas are then stored to the delta store 846. The delta store 846 is storage for temporarily storing the deltas prior to their application to the graph database. The delta store 846 may be any storage suited for temporary storage of data, e.g. an in-memory database or cache; or application memory, such as the memory of the update identifier 824.

At an appropriate time, the deltas in the delta store 846 are applied to the graph database 826. For example, the deltas may be applied when the graph database is experiencing below average load, such as to minimize the impact of the update on users of the graph database 826. The deltas may be applied at a frequency less than that at which the data updates are received but greater than that at which reloads of the graph database occur. For example, deltas may be applied at a frequency of every five minutes to hourly.

Computing Device

Figure 9:
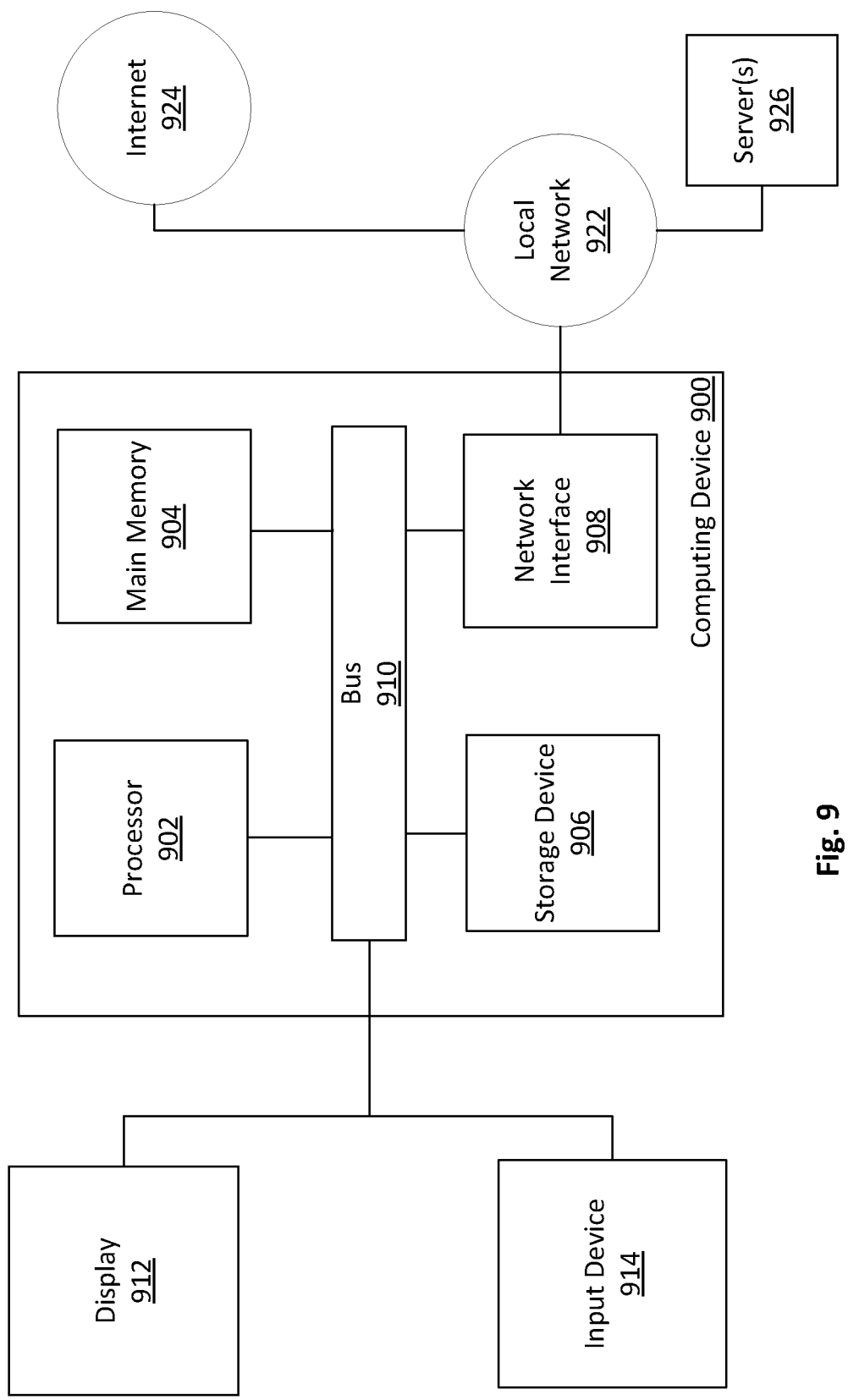
FIG. 9 is a schematic block diagram illustrating a computing device usable for one or more components for systems or software methods implementing the subject innovations.

FIG. 9 is a schematic block diagram illustrating a computing device 900 usable for one or more components for systems, e.g. graph database updating system 700, or software methods, e.g. methods 200, 252, 400, 452, 600, and 630, implementing the subject innovations. The illustrated computing device 900 is intended as an example only, and any other suitable computing device capable of implementing the subject innovations may be used. These computing devices may have different functionality, components and/or different interconnections between components. The computing device may take any suitable form, e.g. a rack server, a desktop computer, a mainframe, a laptop computer, or a smartphone.

Computing device 900 includes a processor 902, a main memory 904, a storage device 906 and a network interface 908. These components of the computing device 900 are coupled to a bus 910 of the computing device.

The processor 902 is a hardware processor configured to execute one or more computer executable instructions stored on the main memory 904. The processor 902 may be a general-purpose processor, e.g. a central processing unit. The processor 902 may have multiple cores and/or be capable of executing multiple cores on a single thread, e.g. by using simultaneous multi-threading. The processor 902 may contain one or more registers and/or one or more local caches. Alternatively or additionally, the processor 902 may be or include a specialized processor, e.g. a graphics processing unit, or a field programmable gate array (FPGA) or application-specific integrated circuit (ASIC) configured to perform specified operations such as one or more steps of the above-described methods. While a processor 902 is referred to, the computing device 900 may include a plurality of processors 902, and these processors may be of the same or different types.

The main memory 904 may be one or more random access memories, or another suitable type of memory for storing instructions or information to be utilized by the processor 902, e.g. a flash memory. The main memory 904 is a non-transitory, computer-readable medium. The main memory 904 may be a volatile memory. Alternatively, it may be a persistent memory of sufficient speed to support the storing of instructions or information undergoing use by the processor. The main memory 904 may also include a volatile component and a persistent component. When methods embodying the subject-innovations are executed and/or systems implemented, the main memory 904 stores computer-readable instructions for executing and/or implementing these systems and/or methods, or components thereof, or one or more computer-readable instructions implementing software utilized in these systems and/or methods, e.g. a graph database server.

The storage device 906 is a persistent, mass storage device. The storage device 906 may be a hard disk drive, a solid-state drive, a flash memory or any other suitable persistent storage device. The storage device 906 may store a persisted computer program including instructions that are or may be transformed into instructions usable to execute the described methods and/or implement the described systems. For example, the storage device 906 may include a compiled binary executable that may be loaded into main memory 904 for execution by the processor 902.

The network interface 908 is a device configured to facilitate communication between the computing device 900 and networks. The network interface 908 may be a wired network interface, e.g. an Ethernet or fiber optic network interface, or a wireless network interface, e.g. a Wi-Fi interface; microwave network link interface, or mobile network interface, e.g. a 4G or 5G network interface. The network interface 908 may be integrated into another component of the computing device 900, e.g. into a motherboard of the computing device 900, or may be part of a network interface card, e.g. a PCI Express card, or network interface peripheral, e.g. a USB network peripheral.

The bus 910 is any suitable device for coupling the components of the computer system 900. For example, the bus 910 may be or may be part of a motherboard or other interconnection fabric, e.g. a silicon interconnect fabric, of the computing device 900.

A display 912 may be connected to the computing device 900 via the bus 910. The display may be a liquid crystal display (LCD), an organic light emitting diode (OLED) display, a cathode ray tube (CRT) display, or any other suitable type of display. The display may be used to display one or more outputs based on computer-readable instructions executed using computing device 900. The display 912 may also be used to display status information of the computing device and/or computer software being executed thereon.

An input device 914 may be connected to the computing device 900 via the bus 910. The input device 914 may be any input device suitable for receiving input from a user for inputting to the computing device 900. For example, the input device may be a keyboard, a pointer device, such as a mouse or touch screen, or a microphone.

A local network 922 is connected to the computing device 900 via the network interface 908. The local network may be any suitable type of network which can be connected to the computing device via then network interface. For example, the local network 922 may be a wired network, a wireless network and/or contain both wired and wireless aspects. Through the local network 922, the computing device 900 may be connected to the Internet 924 and one or more local servers 926. One or more cloud computing devices may be used to implement the subject innovations in conjunction with the computing device 00, and the computing device 900 may be connected to these cloud computing devices via the Internet 924. Additionally, or alternatively, the one or more local servers 926 may be used in conjunction with the computing device 900 to implement the subject innovations.

References contained herein in to 'setting' a first set of relationships to another second set of relationships, in any tense or voice, e.g. 'is set to', 'set to', etc., relate to any operation(s) whereby, on completion of the operation(s), the first set of relationships and the second set of relationships contain the same elements. Such 'setting' operation(s) may be completed by assigning a reference, such that the second set of relationships references the same underlying data structure and/or relationships referenced by the first set of relationships. Such 'setting' operation(s) may alternatively or additionally be completed by copying the relationships contained in the first set of relationships and adding these copies of the relationships of the first set to a data structure representing the second set of relationships.

References contained herein in to 'adding' a second set of relationships to another first set of relationships relate to any operation(s) whereby, on completion of the operation(s), the first set of relationships contains the relationships present in the second set. Such 'adding' operation(s) may be completed by adding the relationships to an extendible data structure or a data structure having sufficient empty space, e.g. adding the relationships to a linked list or an array having sufficient empty. Where a non-extendible data structure or a data structure which is at capacity is used, such 'adding' operation(s) may alternatively or additionally be completed by copying the relationships previously contained in the data structures for the first set of relationships and the second set of relationships to a new data structure representing their addition and assigning a variable for the second set of relationships to this new data structure.

It will be appreciated that various modifications may be made to the embodiments hereinbefore described. Such modifications may involve equivalent and other features which are already known in the design, manufacture and use of graph database systems and component parts thereof and which may be used instead of or in addition to features already described herein. Features of one embodiment may be replaced or supplemented by features of another embodiment.

Although claims have been formulated in this application to particular combinations of features, it should be understood that the scope of the disclosure of the present specification also includes any novel features or any novel combination of features disclosed herein either explicitly or implicitly or any generalization thereof, whether or not it relates to the same invention as presently claimed in any claim and whether or not it mitigates any or all of the same technical problems. The applicants hereby give notice that new claims may be formulated to such features and/or combinations of such features during the prosecution of the present application or of any further application derived therefrom.

What is claimed is:

1. A computer-implemented method comprising:
receiving one or more update requests to update a graph database that stores both (1) foundational relationships and (2) inferred relationships, and wherein the inferred relationships are persisted to the graph database in advance of any queries;
identifying, based on the one or more update requests, a set of foundational relationships for deletion from a graph database, wherein the set of foundational relationships represent relationships between nodes provided by any of external data sources and a user;
inferring, using one or more relationship inference rules, a set of inferred relationships for deletion from the graph database based on the set of foundational relationships for deletion, comprising:
searching for relationships in the set of foundational relationships for deletion that match a relationship specified in a precondition of at least one of the one or more relationship inference rules;
responsive to determining a matching relationship, in the set of foundational relationships for deletion, that matches a relationship specified by the precondition of a relationship inference rule, binding one or more variables of the matching relationship to one or more values of the relationship specified by the precondition of a relationship inference rule;

determining whether any remaining relationships of the precondition are satisfiable by relationships within the set of foundational relationships for deletion;

responsive to determining a relationship within the set of foundational relationships for deletion that satisfies the remaining relationships of the precondition, binding one or more variables of the relationship within the set of foundational relationships to one or more values of the remaining relationships of the precondition;

inferring at least one of the relationships of the set of inferred relationships for deletion using at least one of the matching relationships; and repeating the steps for each of the one or more relationship inference rules; and deleting, from the graph database, a set of relationships for deletion comprising the set of foundational relationships for deletion and the set of inferred relationships for deletion, wherein the set of inferred relationships for deletion is applied as deltas that are applied at a frequency less than a frequency in which the one or more update requests are received but at a higher frequency in which reloads of the graph database occur, and wherein the deltas are applied when the graph database is experiencing below average load.

2. The method of claim 1, comprising:
identifying, based on the one or more update requests, a set of foundational relationships for storing to the graph database; and
inferring, using one or more relationship inference rules, a set of inferred relationships for storing to the graph database based on the set of foundational relationships for storing, wherein the inferring comprises deriving relationships based on any of foundational relationships and other inferred relationships; and
storing, to the graph database, a set of relationships for storing comprising the set of foundational relationships for storing and the set of inferred relationships for storing.

3. The method of claim 2, wherein inferring the set of inferred relationships for storing comprises:
searching for relationships in the set of foundational relationships for storing that match a relationship specified in a precondition of at least one of the one or more relationship inference rules;
determining whether the precondition is satisfiable using at least the matching relationship; and
in response to the precondition being satisfiable, inferring at least one of the relationships of the set of inferred relationships for storing using at least the matching relationship.

4. The method of claim 2, wherein inferring the set of inferred relationships for storing comprises:
setting a storing working set of relationships to the set of foundational relationships for storing to the graph database;
while the storing working set of relationships contains at least one relationship:
initializing a new storing working set of relationships;
for each relationship inference rule of the one or more relationship inference rules:
searching for relationships in the storing working set of relationships that match a relationship specified in a precondition of the relationship inference rule;
for each matching relationship:
determining whether the precondition is satisfiable using at least the matching relationship;
in response to the precondition being satisfiable:
infer one or more relationships using the relationship inference rule; and
updating the new storing working set of relationships based on the inferred one or more relationships; and
setting the storing working set of relationships based on the new storing working set of relationships.

5. The method of claim 1, wherein inferring the set of inferred relationships for deletion comprises:
setting a deletion working set of relationships to the set of foundational relationships for deleting from the graph database;
while the deletion working set of relationships contains at least one relationship:
initializing a new deletion working set of relationships;
for each relationship inference rule of the one or more relationship inference rules:
searching for relationships in the deletion working set of relationships that match a relationship specified in a precondition of the relationship inference rule;
for each matching relationship:
determining whether the precondition is satisfiable using at least the matching relationship;
in response to the precondition being satisfiable:
infer one or more relationships using the relationship inference rule; and
updating the new deletion working set of relationships based on the inferred one or more relationships; and
setting the deletion working set of relationships based on the new deletion working set of relationships.

6. The method of claim 5, wherein inferring one or more relationships using the relationship inference rule comprises:
inferring a set of pre-update inferred relationships based on foundational relationships stored in the graph database and/or relationships inferred therefrom; and
inferring a set of post-update inferred relationships based on the difference between foundational relationships stored in the graph database and the set of foundational relationships for deleting, the set of foundational relationships for storing and/or relationships inferred therefrom.

7. The method of claim 6, wherein updating a new storing working set of relationships comprises adding, to the new storing working set of relationships, a difference between the set of post-update inferred relationships and the set of pre-update inferred relationships, thereby populating the new storing working set of relationships with the fundamental relationships for storing and relationships inferred therefrom, excluding any relationships which would not be inferred due to the removal of the foundational relationships for deletion.

8. The method of claim 6, wherein updating the new deletion working set of relationships comprises adding, to the new deletion working set of relationships, a difference between the set of pre-update inferred relationships and the set of post-update inferred relationships, thereby populating the new deletion working set of relationships with the fundamental relationships for deletion and relationships inferred therefrom, excluding any relationships which would be inferred due to the addition of the foundational relationships for storing.

9. The method of claim 1, wherein the graph database is a triplestore.

10. The method of claim 9, wherein the searching includes searching relationships which include a specific entity in a specific element of a triple in the triplestore, thereby reducing the computational resources used to update the graph database.

11. The method of claim 9, wherein the inferring includes utilizing variables to designate nods in triples of the triplestore, wherein variables are matched to nodes in the graph database during inference, and wherein determining whether the precondition is satisfiable comprises:
   determining that a first node matched to a first variable of a rule includes a specific relationship with a second node matched to a second variable of the rule;
   determining that the second node matched to the second variable of the rule includes a specific relationship with a third node matched to a third variable of the rule;
   inferring a relationship between the first node and the third node based on the rule and adding the inferred relationship to the set of inferred relationships for deletion; and
   applying the rule again, wherein at least one of the variables of the rule is matched to a different node.

12. The method of claim 1, wherein at least one of the one or more update requests is received in response to a change in the state of a network.

13. The method of claim 12, wherein the change in the state of the network comprises a network disconnection between two devices, and the set of foundational relationships for deletion comprises a relationship representing the network connection between the two devices, optionally wherein the set of inferred relationships for deletion comprises one or more relationships representing one or more network connections between devices transitively connected by the network connection between the two devices.

14. A processing device comprising one or more processors and memory storing instructions that, when executed, cause the one or more processors to:
   receive one or more update requests to update a graph database that stores both (1) foundational relationships and (2) inferred relationships, and wherein the inferred relationships are persisted to the graph database in advance of any queries;
   identify, based on the one or more update requests, a set of foundational relationships for deletion from a graph database, wherein the set of foundational relationships represent relationships between nodes provided by any of external data sources and a user;
   infer, using one or more relationship inference rules, a set of inferred relationships for deletion from the graph database based on the set of foundational relationships for deletion, wherein inferred relationships are derived from and dependent on any of the foundational relationships and other inferred relationships, comprising:
      searching for relationships in the set of foundational relationships for deletion that match a relationship specified in a precondition of at least one of the one or more relationship inference rules;
      responsive to determining a matching relationship, in the set of foundational relationships for deletion, that matches a relationship specified by the precondition of a relationship inference rule, binding one or more variables of the matching relationship to one or more values of the relationship specified by the precondition of a relationship inference rule;
      determining whether any remaining relationships of the precondition are satisfiable by relationships within the set of foundational relationships for deletion;
      responsive to determining a relationship within the set of foundational relationships for deletion that satisfies the remaining relationships of the precondition, binding one or more variables of the relationship within the set of foundational relationships to one or more values of the remaining relationships of the precondition;
      inferring at least one of the relationships of the set of inferred relationships for deletion using at least one of the matching relationships; and
   repeating the steps for each of the one or more relationship inference rules; and
   deleting, from the graph database, a set of relationships for deletion comprising the set of foundational relationships for deletion and the set of inferred relationships for deletion, wherein the set of inferred relationships for deletion is applied as deltas that are applied at a frequency less than a frequency in which the one or more update requests are received but at a higher frequency in which reloads of the graph database occur, and wherein the deltas are applied when the graph database is experiencing below average load.

15. A non-transitory computer-readable medium having instructions stored thereon for programming a processing device to perform the steps of:
   receiving one or more update requests to update a graph database that stores both (1) foundational relationships and (2) inferred relationships, and wherein the inferred relationships are persisted to the graph database in advance of any queries;
   identifying, based on the one or more update requests, a set of foundational relationships for deletion from a graph database, wherein the set of foundational relationships represent relationships between nodes provided by any of external data sources and a user;
   inferring, using one or more relationship inference rules, a set of inferred relationships for deletion from the graph database based on the set of foundational relationships for deletion, wherein inferred relationships are derived from and dependent on any of the foundational relationships and other inferred relationships, comprising:
      searching for relationships in the set of foundational relationships for deletion that match a relationship specified in a precondition of at least one of the one or more relationship inference rules;
      responsive to determining a matching relationship, in the set of foundational relationships for deletion, that matches a relationship specified by the precondition of a relationship inference rule, binding one or more variables of the matching relationship to one or more values of the relationship specified by the precondition of a relationship inference rule;
      determining whether any remaining relationships of the precondition are satisfiable by relationships within the set of foundational relationships for deletion;
      responsive to determining a relationship within the set of foundational relationships for deletion that satisfies the remaining relationships of the precondition, binding one or more variables of the relationship within the set of foundational relationships to one or more values of the remaining relationships of the precondition;
      inferring at least one of the relationships of the set of inferred relationships for deletion using at least one of the matching relationships; and repeating the steps for each of the one or more relationship inference rules; and deleting, from the graph database, a set of relationships for deletion comprising the set of foundational relationships for deletion and the set of inferred relationships for deletion, wherein the set of inferred relationships is applied as deltas that are applied at a frequency less than a frequency in which the one or more update requests are received but at a higher frequency in which reloads of the graph database occur, and wherein the deltas are applied when the graph database is experiencing below average load.

16. The non-transitory computer-readable medium of claim 15, wherein the steps further include:

identifying, based on the one or more update requests, a set of foundational relationships for storing to the graph database; and inferring, using one or more relationship inference rules, a set of inferred relationships for storing to the graph database based on the set of foundational relationships for storing, wherein the inferring comprises deriving relationships based on any of foundational relationships and other inferred relationships; and storing, to the graph database, a set of relationships for storing comprising the set of foundational relationships for storing and the set of inferred relationships for storing.

17. The non-transitory computer-readable medium of claim 15, wherein inferring the set of inferred relationships for deletion comprises:

setting a deletion working set of relationships to the set of foundational relationships for deleting from the graph database;

while the deletion working set of relationships contains at least one relationship:

initializing a new deletion working set of relationships;

for each relationship inference rule of the one or more relationship inference rules:

searching for relationships in the deletion working set of relationships that match a relationship specified in a precondition of the relationship inference rule;

for each matching relationship:

determining whether the precondition is satisfiable using at least the matching relationship;

in response to the precondition being satisfiable:

infer one or more relationships using the relationship inference rule; and updating the new deletion working set of relationships based on the inferred one or more relationships; and setting the deletion working set of relationships based on the new deletion working set of relationships.

18. The non-transitory computer-readable medium of claim 15, wherein the graph database is a triplestore.

19. The non-transitory computer-readable medium of claim 15, wherein at least one of the one or more update requests is received in response to a change in the state of a network.

* * * * *